US005284623A

United States Patent [19]

Yamori et al.

[11] Patent Number: 5,284,623

[45] Date of Patent: Feb. 8, 1994

[54] DIVISION DIRECTING DEVICE FOR BLOOD TESTING

[75] Inventors: Toshio Yamori, Kyoto; Ryuko Kayagaki, Tokyo, both of Japan

[73] Assignee: Falco Biosystems, Inc., Kyoto, Japan

[21] Appl. No.: 834,464

[22] Filed: Feb. 12, 1992

[30] Foreign Application Priority Data

Jun. 25, 1991 [JP] Japan .................................. 3-178864

[51] Int. Cl.[5] .......................... G01N 21/01; B01L 9/06

[52] U.S. Cl. ...................................... 422/99; 422/104; 211/74; 356/244; 356/246

[58] Field of Search ........................ 211/74, 43, 80, 81, 211/85, 98, 132, 190; 422/104, 99; 356/244, 246; 248/447, 454, 455, 456, 457

[56] References Cited

U.S. PATENT DOCUMENTS

| | | | |
|---|---|---|---|
| 4,207,289 | 6/1980 | Weiss | 422/104 |
| 4,358,203 | 11/1982 | Citrin | 356/432 X |
| 4,453,639 | 6/1984 | Sharma | 422/104 |
| 4,692,609 | 9/1987 | Petterson | 356/244 |
| 4,710,031 | 12/1987 | Kelly et al. | 356/244 |
| 5,169,601 | 12/1992 | Ohta et al. | 422/73 |

*Primary Examiner*—James C. Housel
*Assistant Examiner*—Robert Carpenter
*Attorney, Agent, or Firm*—Howson and Howson

[57] ABSTRACT

A device for indicating the sequence for division of a blood sample comprises an adjustable tilting rack plate for supporting a rack with a number of test tube holes, an array of indicating lamps which correspond to the, test tube holes, and which are selectively illuminated to indicate when the division of each sample is to be performed.

10 Claims, 5 Drawing Sheets

DIVISION DIRECTING DEVICE FOR BLOOD TESTING

BACKGROUND OF THE INVENTION

1. Field of the Invention

This invention relates generally to a system for directing the separation of test samples, such as blood, for use in diagnostic assays.

2. Description of Related Art

In blood testing, it has been conventional practice to separate collected blood (the parent sample) with a centrifuge into a blood clot and serum, and then to subject the serum (the child sample) to various tests for the diagnosis of disease, which aid in determining the appropriate clinical treatment.

When carrying out such tests, testing personnel are required to place the test tube containing a sample in a test-tube rack. While comparing a written request for each test to be performed with the sample number, the personnel take a number of aliquots from each test tube, depending on the number of tests to be performed. Because the division and the correlation between the proper test and sample number must be performed manually, the conventional method has the problem that an aliquot of the child sample may be taken out erroneously. This problem is particularly apparent when the tests to be performed on the various samples differ.

There is a need for a device capable of eliminating the errors which occur when division and correlation of the requested test with the sample number are carried out by the conventional method.

SUMMARY OF THE INVENTION

The invention provides a device capable of indicating to a clinical laboratory technician, the sequence in which test samples, usually blood, are to be divided for testing and indicating completion of the division. This device is particularly advantageous because it permits division of the test samples to be carried out satisfactorily for every test by following directions provided by an array of indicating lamps. The need to perform the work while comparing test requests with sample number is eliminated. Thus, the likelihood of error in taking out samples is greatly reduced, and, at the same time, the efficiency of the division work is remarkably improved.

The apparatus in accordance with the invention comprises a rack plate for supporting a test-tube rack having a plurality of test-tube holding holes. A sequence indicating device, arranged on the rack plate, comprises an array of indicating lamps, which correspond to the test-tube holding holes. The rack plate is tiltable so that it can be adjusted to accommodate an individual operator, and the operator can observe each indicating lamp through its corresponding test tube.

The apparatus control which stores in memory, after entry by the operator, the numbers of the test-tube holding holes for each test of a series of tests. The control means activates (i.e. illuminates) the indicator lamp corresponding to the number of the test-tube holding hole for every test item number. The system also has a switch which sends a signal indicating completion of division of each sample to the control means. When this signal is received by the control means, the division directing means turns on the indicator lamp corresponding to the number of the test-tube holding hole of the test tube containing the sample to be divided next.

Other aspects and advantages of the invention are described further in the following detailed description of the preferred embodiments thereof.

DESCRIPTION OF THE PREFERRED EMBODIMENT

Figure 1:
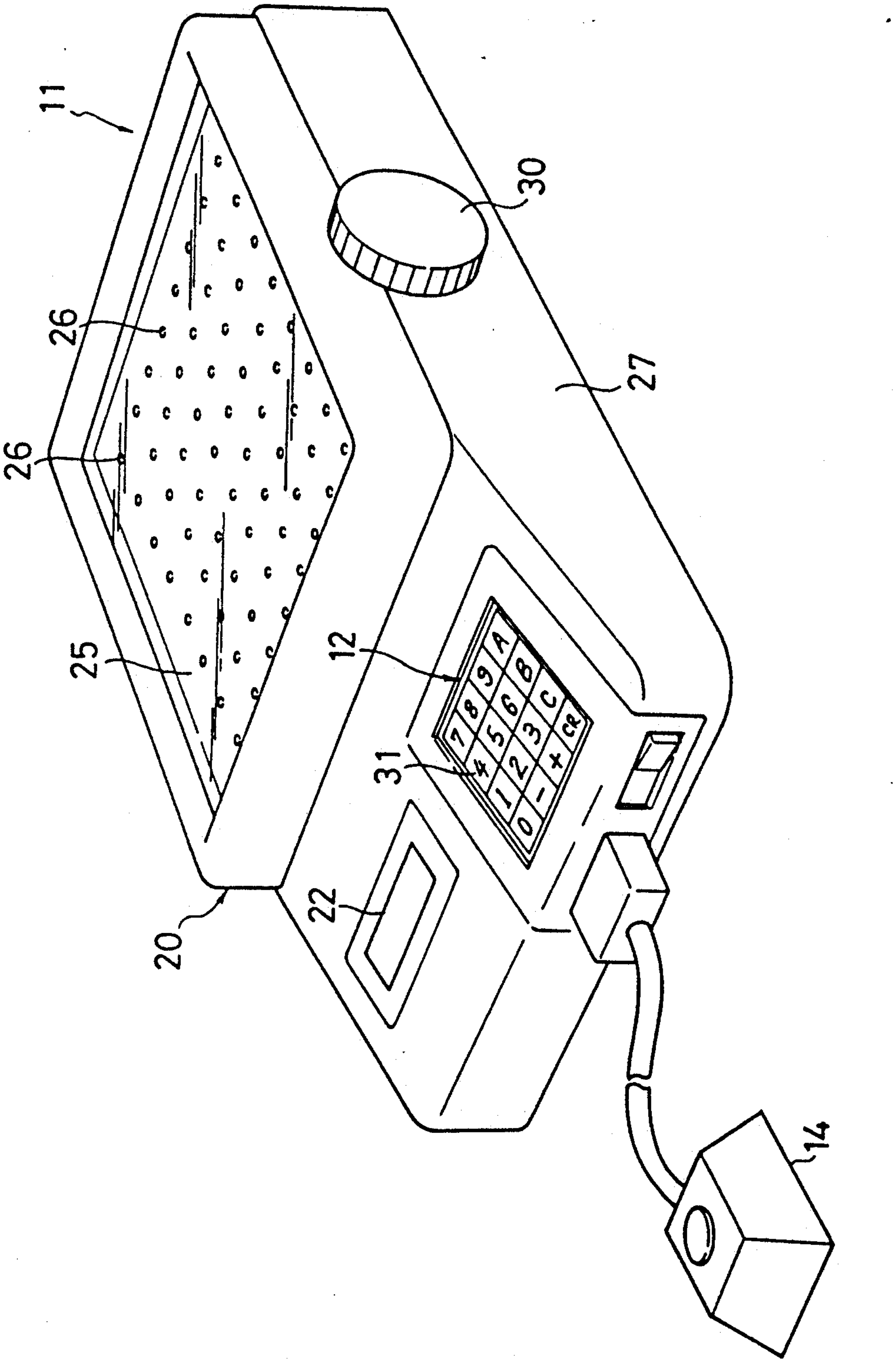
FIG. 1 is a perspective view of the test tube rack holding and indicating device and a pushbutton switch.

The invention provides a device capable of indicating the sequence in which test samples, usually blood, are to be selected for division into aliquot parts and for indicating completion of division. This system is particularly advantageous because it permits the division to be carried out satisfactorily for every test item by following directions provided by the illumination of the indicator lamps, without the need to perform the work while comparing test numbers with sample numbers. Thus, errors in taking out samples are greatly reduced, and, at the same time, the efficiency of division work is remarkably improved.

The apparatus of the invention comprises a rack plate for supporting a test-tube rack equipped with a plurality of test-tube holding holes. An array of indicating lamps which correspond to the test-tube holding holes is arranged on the rack plate.

Advantageously, tilt of the rack plate is adjustable for the individual operator so that the operator views the samples in a direction approximately perpendicular to the face of the rack plate. This permits the indicator lamps to be observed through their corresponding test tubes, thus permitting testing personnel to carry out division of the samples without error.

Testing personnel place a test-tube rack, with a plurality of test tubes containing samples arranged thereon, on the rack plate. The sample test tubes are arranged in order of sample number. The test item numbers, and their corresponding test tube number and holding hole number are first input into the control means and are stored in the memory of the control means.

The control means turns on the indicator lamp corresponding to the number of the first test-tube holding hole for a first test item.

The operator or testing personnel then proceeds to take aliquots from (i.e. divide) the sample test tubes as directed by the indicator lamps. After the first sample is divided, the switch signals the completion of the division and the control means turns on the indicator lamp corresponding to the number of the test-tube holding hole having the test tube to be divided next. The direction lamp turned on is not always immediately adjacent to the previous lamp. This is because not all samples are subjected to the same tests.

Thereafter, the division from the test tube as directed by the lighting of the indicator lamps and the operation of the switch are repeated in the same manner. The direction lamps turn on either sequentially or in skipping manner depending on whether the samples to be subjected to a particular test are aligned consecutively or randomly.

After all the samples have been taken for the first test, the control means turns on the indicator lamp corresponding to the test-tube holding hole of the first test tube containing a sample to be divided for next test item. Thereafter, division is carried out for every subsequent test item in the manner described above.

One embodiment of the present invention is described below with reference to drawings.

Figure 2:
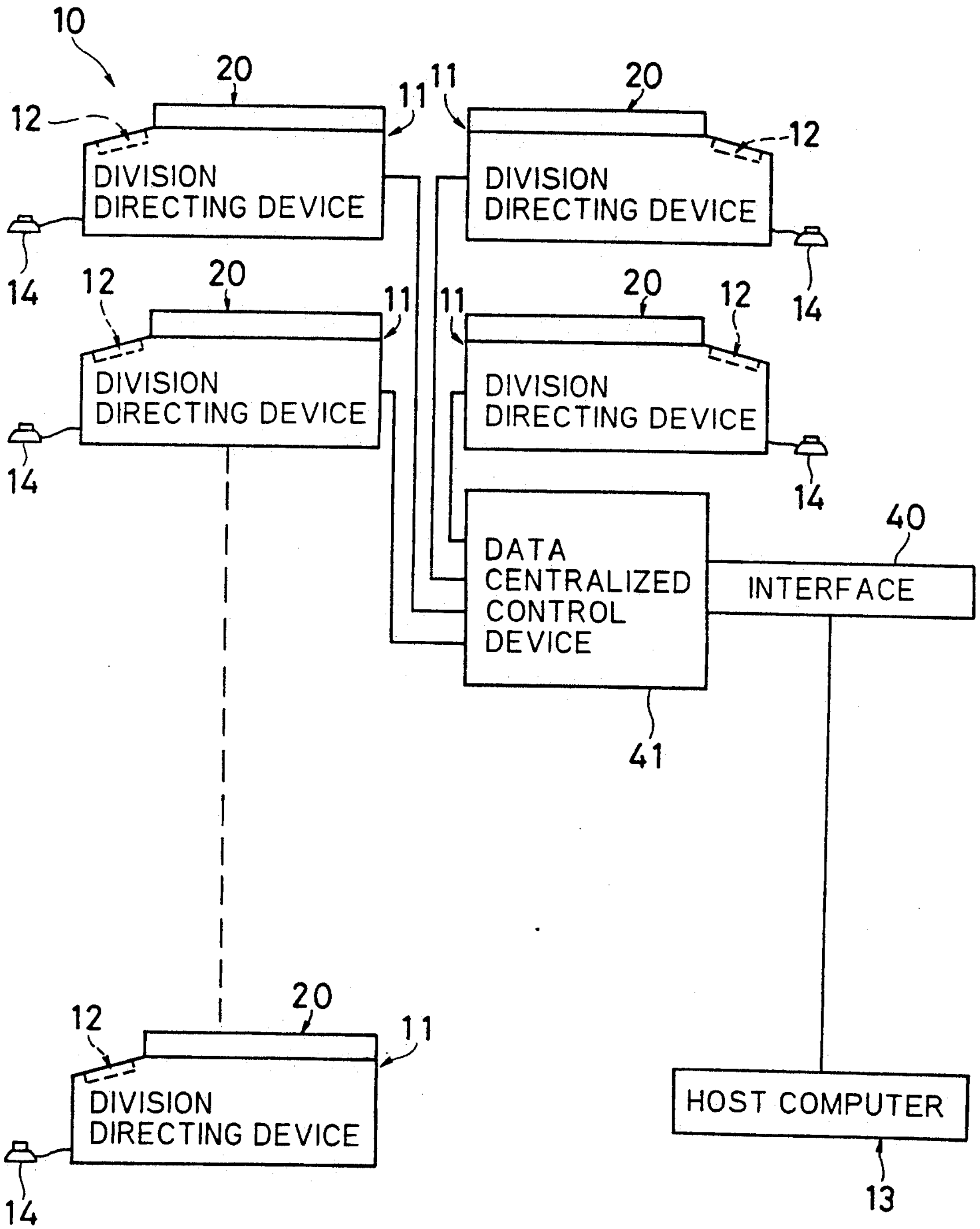
FIG. 2 is a schematic view of a system of test tube rack holding and indicating devices, and a control system in accordance with the invention.

As shown in FIG. 2, a system 10 comprises one or more test tube rack support and indicator units 11, a host computer 13, an interface 40 and a data centralized-control device 41. Each test tube rack support and indicator unit is provided with a pushbutton switch 14.

Figure 3:
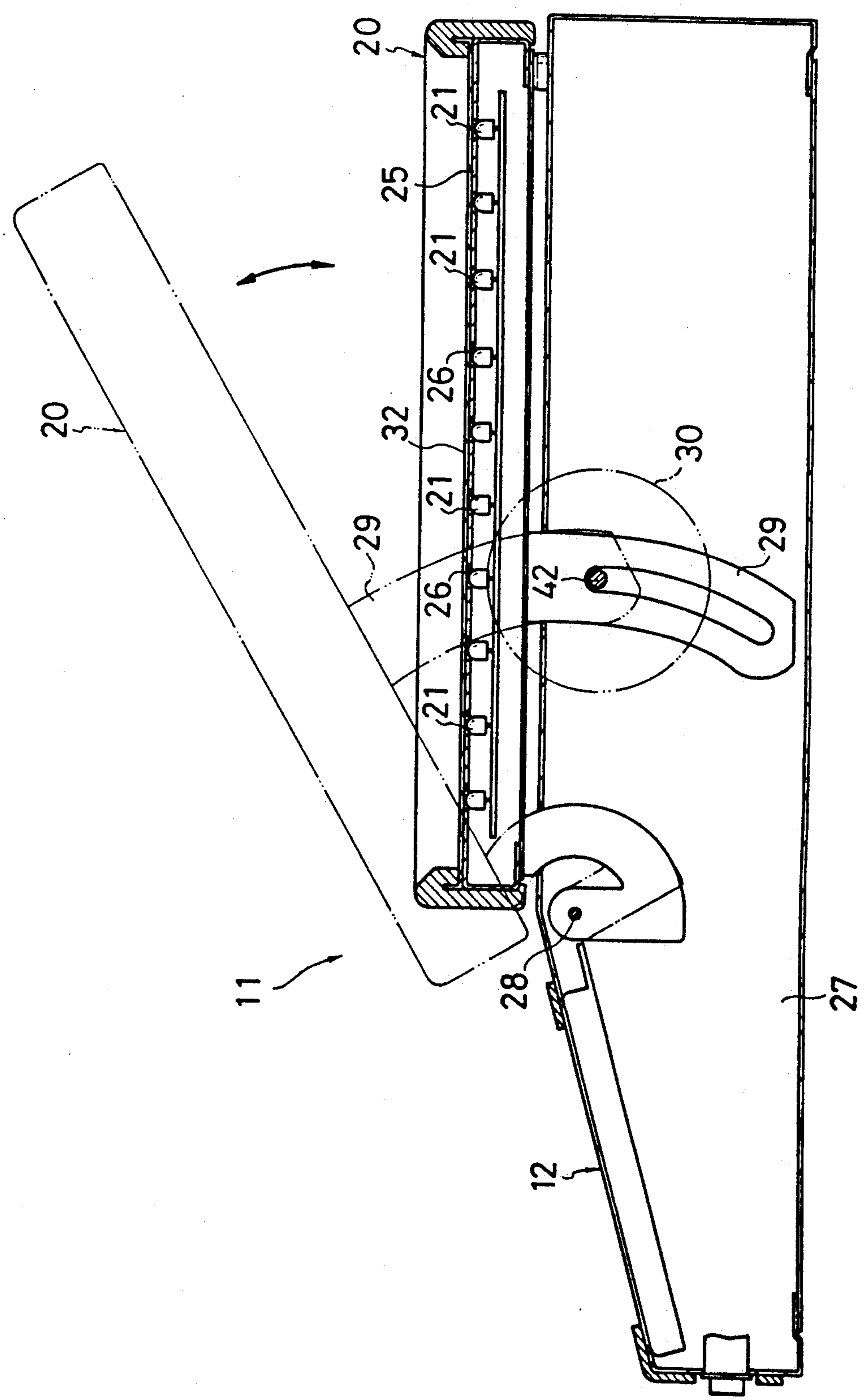
FIG. 3 is a cross sectional side view of the test tube rack holding and indicating device.
Figure 4:
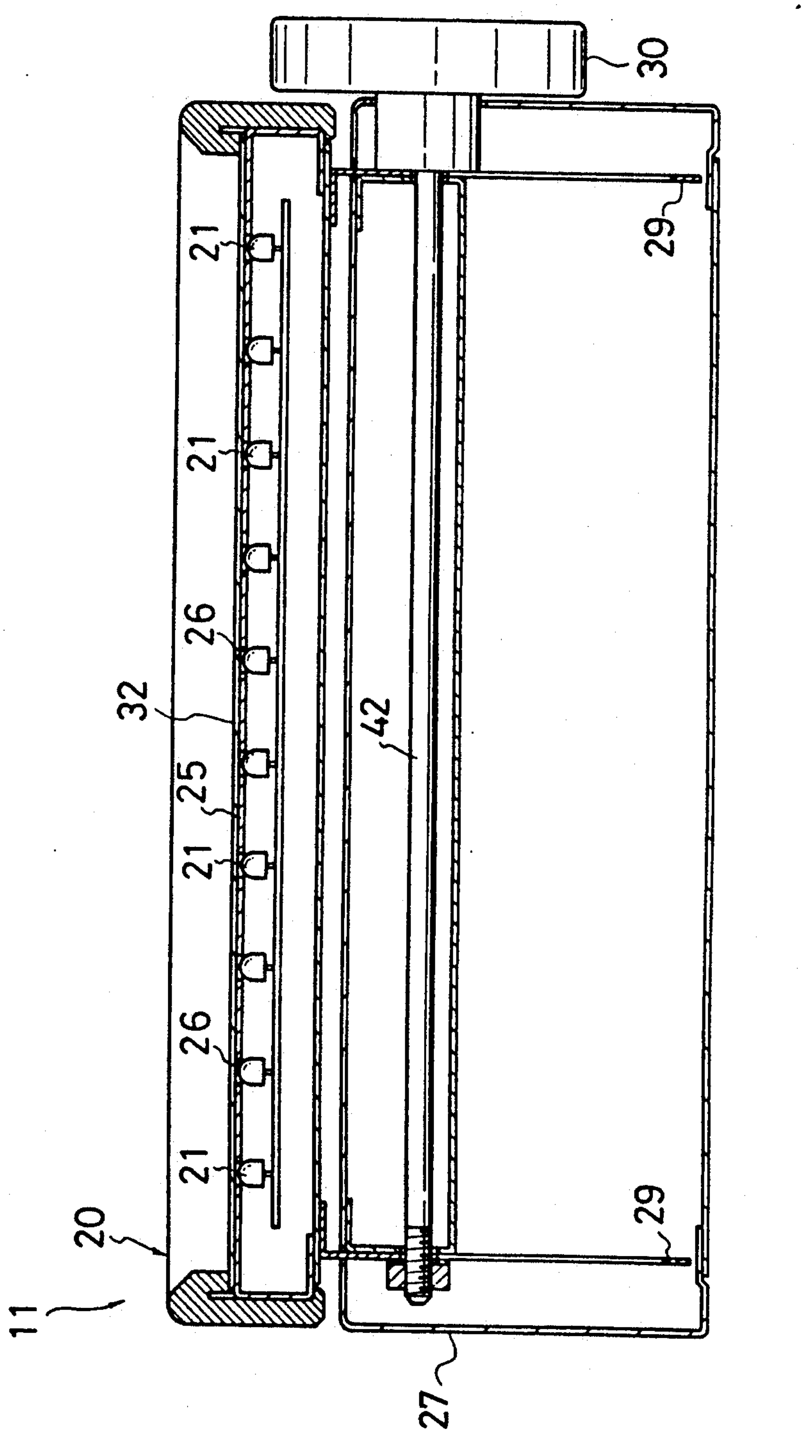
FIG. 4 is a cross sectional front view of the test tube rack holding and indicating device.

As is shown in FIGS. 1, 3 and 4, test tube rack support and indicator unit 11 is equipped with a rack plate 20, a plurality of indicating lamps 21, which may be light emitting diodes (LEDs), a keyboard 12 and a display 22.

Figure 5:
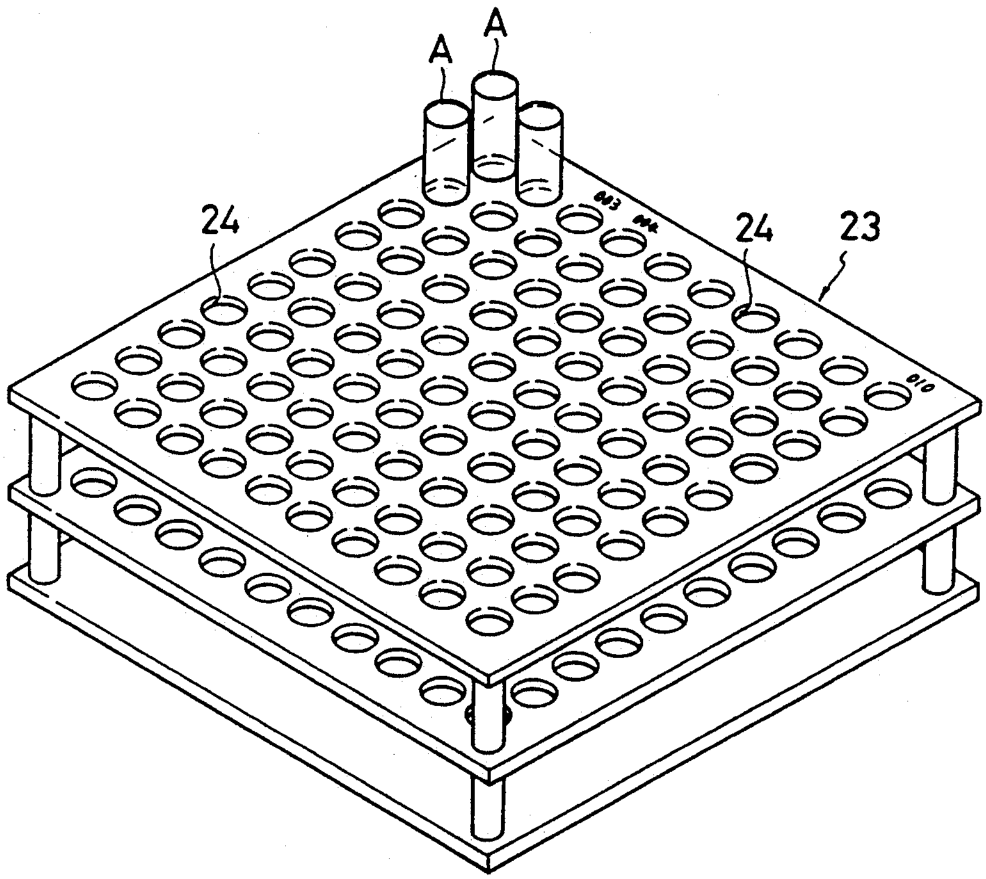
FIG. 5 is a perspective view of the test-tube rack used with the invention.

A rack plate 20 is provided on the support and indicator unit for supporting a test-tube rack 23 holding a plurality of test tubes containing serum (child samples), as shown in FIG. 5. The test-tube rack 23 has an array of perforations which serve as test-tube holding holes. The embodiment shown in FIG. 5 has a total of 100 test-tube-receiving holes arranged in a 10 by 10 array. It should be understood, of course, that different numbers and arrangements of the test tubes may be used as desired. A number is assigned to each hole. Plural test-tube racks may also be used. In such a case, the test-tube racks are also numbered.

One hundred LEDs 21 are arranged in an array under a rack-receiving area 25 of the rack plate 20, one for each of the test tubes A in test-tube rack 23. On the rack receiving area 25 are formed a plurality of holes 26 each corresponding to an LED 21, so that an operator can determine whether or not the LED is lit. On the surface of the rack-receiving area 25 is placed a transparent plastic board 32, as shown in FIG. 3. When the apparatus is turned on, the emission of all of the LEDs 21 enables testing personnel to test the working order of the LEDs. In this manner, it is possible to prevent error caused by a defective LED.

The rack plate 20 is pivoted on a frame 27 of the test tube rack support and indicator unit 11 on a pivot axis 28. so that the tilt angle of the rack plate 20 is adjustable. The tilt angle of the rack plate 20 can be set by lifting curved, slotted slides 29 arranged on both sides of the lower surface of the rack plate 20, and tightening them with screw 42 (FIG. 4) to secure the rack plate in fixed relationship the frame 27 at the desired angle of tilt. Knob 30 is arranged on the frame 27 in order to allow screw 42 to be tightened manually. The tilt angle of the rack plate is adjusted so that the LEDs 21 can be observed through their corresponding test tubes. Visualization of illuminated LEDs is optimized by maintaining the vision of testing personnel in a direction approximately perpendicular to the face of rack plate 20. This helps prevent error in determining which test tube is identified by illumination of a particular LED 21, and allows testing personnel, from time to time, to change their positions from sitting to standing and vice versa.

Keyboard 12 has a plurality of keys 31 for entry of the required information, including a worksheet number and a worksheet sequence number.

The host computer 13 stores in memory the numbers of the test-tube rack and the test-tube holding hole corresponding to a test item number, and the sequence thereof, in accordance with a worksheet. Furthermore, the computer is connected to a plurality of units 11, and illuminates the LED 21 corresponding to the number of the test-tube holding hole for every test item number.

The pushbutton switch 14 provided in conjunction with each unit 11, sends a the signal indicating completion of division of each sample to the data centralized-control device 41.

Data centralized-control device 41 is a device to assign the indicating data to the appropriate support and indicating units 11, and to modify the data, before it is transferred, so that it is manageable by the support and indicating units 11.

In the test tube rack 23, there are arranged test tubes containing child samples in the order of collected blood (parent) sample number, or in the order of child sample number where numbers have been assigned to the child samples. In the following description of how the system is operated it is assumed that child samples are numbered.

Because test tubes are arranged in the order of child sample number, each set of numbers for the test tube rack 23 and the test tube holding space 24 corresponds to a child sample number.

Testing personnel enter a first worksheet number and worksheet sequence number through keyboard 12, thus indicating the first test to be performed. The data centralized-control device 41 communicates with the host computer 13, and sends the corresponding child sample number to the division directing device 11. Then, the support and indicating unit 11 indicates to the operator the proper test tube rack. The test operator places the indicated test tube rack 23 on the rack plate 20.

Subsequently, the test tube holding hole number, for example No. 001, corresponding to a first child sample number is shown on display 22, and the LED 21 corresponding to the appropriate test tube holding hole is concurrently illuminated.

Where the first child sample is not to be tested for the first selected item, there is no illumination of the LED corresponding to the first test tube holding hole No. 001. Rather, the apparatus will cause illumination of the LED corresponding to the next child sample requiring the particular test. For example, if the sample corresponding to test tube holding hole No. 002 is the first to require a particular test, the LED corresponding to that tube will be the first one to be illuminated.

Testing personnel remove the appropriate amount of the sample from the test tube corresponding to the illuminated LED 21. The thus divided child sample serves as a so-called "grandchild sample", and is subjected to the appropriate test.

When the pushbutton switch 14 is depressed by the test operator after the first child sample is divided, the signal for completion of division is sent to the data centralized-control device 41 when then extinguishes the LED corresponding to the sample just divided and illuminates another LED corresponding to the number of the sample to be divided next. Testing personnel divide the child sample from the test tube corresponding to the illuminated LED. During this time, work sheet number, work sheet sequence number, test item number, rack number, child sample number, the number of test tube holding hole, and the like are displayed on display 22.

In the same manner, thereafter, an aliquot is divided out from the next test tube having its corresponding LED illuminated, and the pushbutton switch 14 is again depressed. When not all of the child samples are subjected to the same tests, the LEDs are illuminated in a sequence in which some are skipped. The samples corresponding to the skipped LEDs are not divided.

After the completion of the division concerning the test item to be first tested, the test item number to be tested next is entered through keyboard 12, and the procedure described above is carried out. In this manner, testing personnel perform the division for every test item, based on the illumination of the LEDs.

As previously mentioned, by providing sequential illumination of individual samples to be divided, the invention greatly reduces the likelihood of operator error, and improves speed and efficiency of testing remarkably. The adjustability of the tilt of the rack plate makes it possible to achieve still further assurance against errors, and also improves operator comfort by allowing the operator to change position from sitting to standing and from standing to sitting, while providing for optimum observing conditions in either position.

Various modifications can be made to the apparatus and method as described above without departing from the scope of the invention as defined in the following claims.

We claim:

1. In a test tube rack holder for use in clinical laboratories comprising a test tube rack equipped with a plurality of holes for holding test tubes containing test samples, means providing a rack plate for receiving and supporting said test tube rack said rack plate having arranged thereon a plurality of indicator lamps corresponding to the test tube holding holes on the rack, means for selectively illuminating said indicator lamps to identify particular test tubes to an operator, and base means for supporting said rack plate from a surface, the improvement comprising hinge means connecting said rack plate to said base means while allowing said rack plate to be adjusted through a range of inclinations relative to said base means, and means for selectably locking said rack plate at multiple different inclinations within said range, whereby the conditions for observation of the illumination emitted by said lamps can be optimized for different operator positions.

2. In an apparatus for indicating to a clinical laboratory technician the sequence in which test samples are to be divided for testing comprising a test tube rack equipped with a plurality of holes for holding test tubes containing test samples, means providing a rack plate for receiving and supporting said test tube rack, a plurality of indicator lamps arranged on said rack plate and corresponding to said test tube holding holes, control means for storing in memory an identification of the test tube holding hole corresponding to each of a plurality of test tubes containing said samples and turning on the indicator lamp corresponding to the test tube holding hole for each test tube, switch means for signalling completion of division of each sample to said control means, wherein, upon receipt of the signal from said switch means, said control means turns on the indicator lamp corresponding to the test tube holding hole of the test tube containing a sample to be divided next, and base means for supporting said rack plate from a surface, the improvement comprising hinge means connecting said rack plate to said base means while allowing said rack plate to be adjusted through a range of inclinations relative to said base means, and means for selectably locking said rack plate at multiple different inclinations within said range, whereby the conditions for observation of the illumination emitted by said lamps can be optimized for different operator positions.

3. In an apparatus for indicating to a clinical laboratory technician the sequence in which test samples are to be divided for testing comprising a test tube rack equipped with a plurality of holes for holding test tubes containing test samples, means providing a rack plate for receiving and supporting said test tube rack indicator means for indicating the test tube holding hole which contains the sample to be subjected to a particular test, and means for signalling to said indicator means the completion of division of the sample, wherein, upon receiving the signal form the signalling means, said indicator means indicates the test tube holding hole containing the next sample to be tested, and base means for supporting said rack plate form a surface, the improvement comprising hinge means connecting said rack plate to said base means while allowing said rack plate to be adjusted through a range of inclinations relative to said base means, and means for selectably locking said rack plate at multiple different inclinations within said range.

4. Apparatus according to claim 3 wherein the indicator means indicates the test tube holding hole containing the sample to be tested by means of a plurality of indicating lamps arranged on said rack plate corresponding to said test tube holding holes, said indicator means including means for storing in memory an identification of the test tube holding hole corresponding to each of a plurality of test tubes, and, for each test to be performed, turning on the indicating lamp corresponding to the test tube holding hole from which a test sample is to be divided.

5. The division directing system according to claim 4 wherein the indicating lamps are light emitting diodes.

6. A test tube rack holder according to claim 1 in which said means for selectably locking said rack plate comprises at least one slide connected to said rack plate, said slide having a slot, and screw means on said base including a shaft extending through said slot, said screw means having knob means for frictionally engaging said slide, whereby said rack plate can be locked at any inclination within said range.

7. Apparatus according to claim 2 in which said base has a front panel, a rear and left and right sides, said front panel having mounted thereon means selected from the group consisting of keyboard means and display means, and in which said hinge means is arranged to pivot said rack plate about a pivot axis extending form the left side to the right side of the base and located closer to said front panel than to said rear.

8. Apparatus according to claim 7 in which said means for selectably locking said rack plate comprises at least one slide connected to said rack plate, said slide having a slot, and screw means on said base including a shaft extending through said slot, said screw means having knob means for frictionally engaging said slide, whereby said rack plate can be locked at any inclination within said range.

9. Apparatus according to claim 3 in which said base has a front panel, a rear and left and right sides, said front panel having mounted thereon means selected from the group consisting of keyboard means and display means, and in which said hinge means is arranged to pivot said rack plate about a pivot axis extending from the left side to the right side of the base and located closer to said front panel than to said rear.

10. Apparatus according to claim 9 in which said means for selectably locking said rack plate comprises at least one slide connected to said rack plate, said slide having a slot, and screw means on said base including a shaft extending through said slot, said screw means having knob means for frictionally engaging said slide, whereby said rack plate can be locked at any inclination within said range.

* * * * *